July 1, 1924.
J. URBAN
PRUNING SHEARS
Filed April 28, 1921
1,499,565
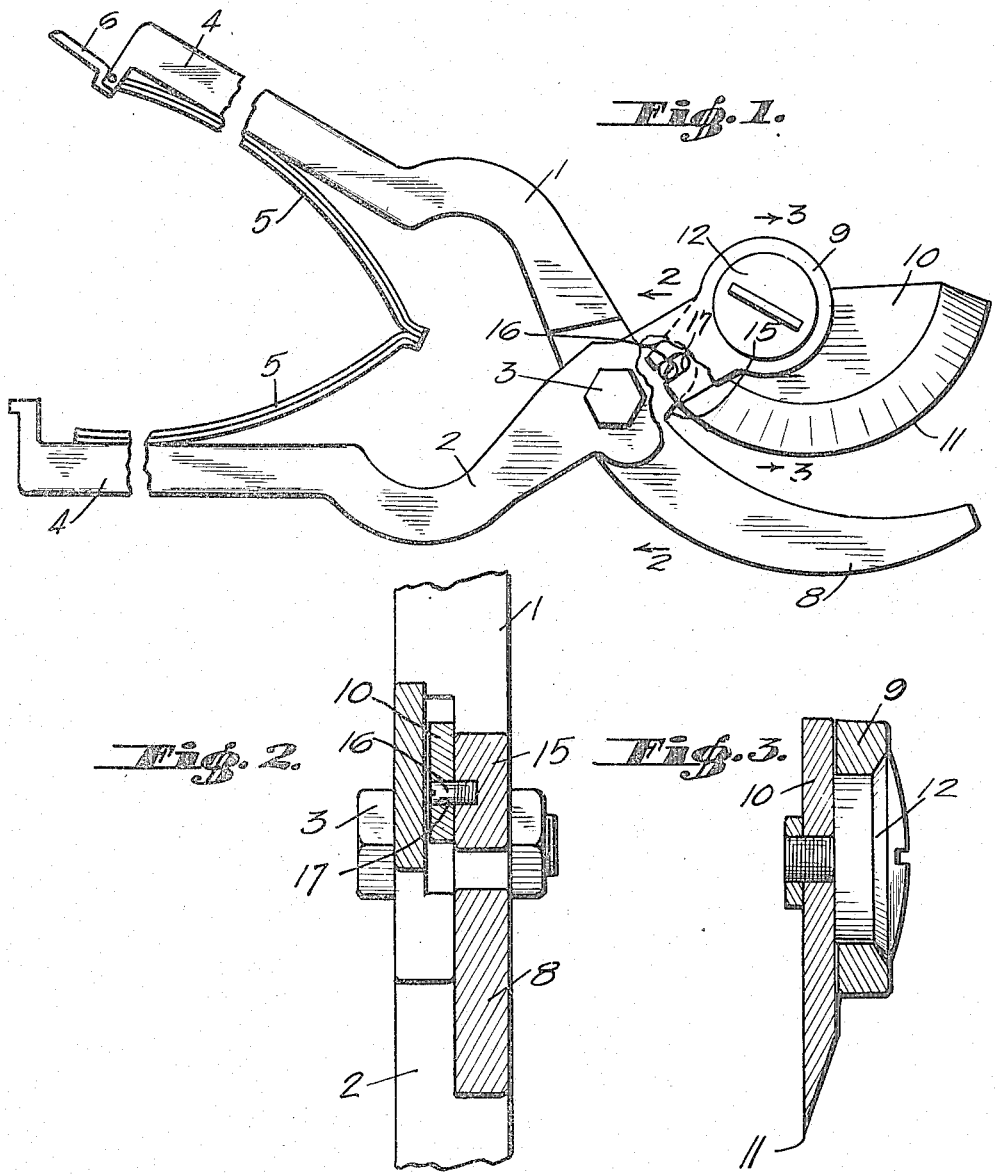
JOSEPH URBAN
INVENTOR.
BY Hazard & Miller
ATTORNEYS.

Patented July 1, 1924.

1,499,565

UNITED STATES PATENT OFFICE.

JOSEPH URBAN, OF LOS ANGELES, CALIFORNIA.

PRUNING SHEARS.

Application filed April 28, 1921. Serial No. 465,103.

*To all whom it may concern:*

Be it known that I, JOSEPH URBAN, a citizen of the United States, residing at Los Angeles, in the county of Los Angeles and State of California, have invented new and useful Improvements in Pruning Shears, of which the following is a specification.

This invention relates to pruning shears, and the like, in which the blades of the shears have a combined movement relative to one another so as to produce a so-called draw cut.

It is the specific object of the present invention to provide an arrangement of shears of this character wherein the operating connection adapted to produce the desired pivotal movement of one of the blades and its handle, is covered by the other one of the crossed handles so as to protect said parts, while at the same time affording an efficient shear structure.

The invention will be readily understood from the following description of the accompanying drawings, in which:

Figure 1 is a side elevation of shears constructed in accordance with the invention.

Figs. 2 and 3 are transverse sections on the lines 2—2 and 3—3 of Fig. 1.

The crossed handles of the shears are shown at 1 and 2 and are pivoted together by a usual bolt 3. The rearward extensions of these handles may be formed as any usual or desired members arranged to be gripped by the hand and as shown at 4, and said rearward extensions of the handles are normally swung apart by spring means shown as co-operating leaf springs 5. A usual catch 6 may be provided for locking the handles in closed position and against the tension of the springs 5.

The extension of handle 1 which projects forwardly from pivot bolt 3 is a curved blade 8 forming a rigid extension of handle 1, and the extension of handle 2 which projects forwardly from the pivot bolt is a bearing lug 9. The bearing lug and the rigid blade are transversely spaced so that a pivoted blade 10 may be received against the inner surface of bearing lug 9 so as to cooperate with blade 8 in order to form the shearing action.

The cutting edge of blade 10 is curved as shown at 11, and said blade is pivoted to lug 9 as by the bolt 12 in order that when the handles of the shears are swung toward one another, the blades will be swung toward one another, while at the same time blade 10 is rotated upon the pivot 12 in order that a draw cut will be produced by the shears.

The operating engagement for swinging blade 10 upon pivot 12 is so positioned as to be covered and protected by the handle having rigid blade 8. For this purpose said handle is provided with an enlargement 15 adjacent pivot bolt 3, and a set screw 16 is threaded into the inner surface of this enlargement so that the head of the screw is received in a slot 17 provided in the edge of blade 10. The parts are so positioned that when the handles are moved upon their pivot bolt 3, the pin 16 engaging in slot 17 will also swing blade 10 upon its pivot bolt 12 in order to produce the desired action of the shearing blades.

It will be noted that the construction, as thus described, provides complete protection for the operating connection between handle 1 and the blade 10, and that as a consequence a durable structure is produced, and one which at the same time will be efficient in its action.

Various changes may be made without departing from the spirit of the invention as claimed.

What is claimed is:

1. Shears comprising crossed pivoted handles, a stationary blade fixed on one of the handles, a movable blade pivoted on the other handle, and a pin-and-slot connection between the movable blade and the handle for the stationary blade, said connection being normally disposed between the pivot of the handles and the pivot of the blade so associated with the blade and handle as to be completely covered irrespective of the position of the handles or blades.

2. Shears comprising crossed pivoted handles, a stationary blade on one handle, an enlargement on the last mentioned handle, a lug formed on the other handle beyond the pivot of the handles, a movable blade pivoted on the lug and having a recess therein at a point which is at all times covered by one end and the enlargement of the other, and a member extending from the inner side of the enlargement and engaging within said recess for the purpose described.

In testimony whereof I have signed my name to this specification.

JOSEPH URBAN.